W. MacGLASHAN.
CONTROL LOCK.
APPLICATION FILED MAR. 9, 1914.
1,113,230.
Patented Oct. 13, 1914.
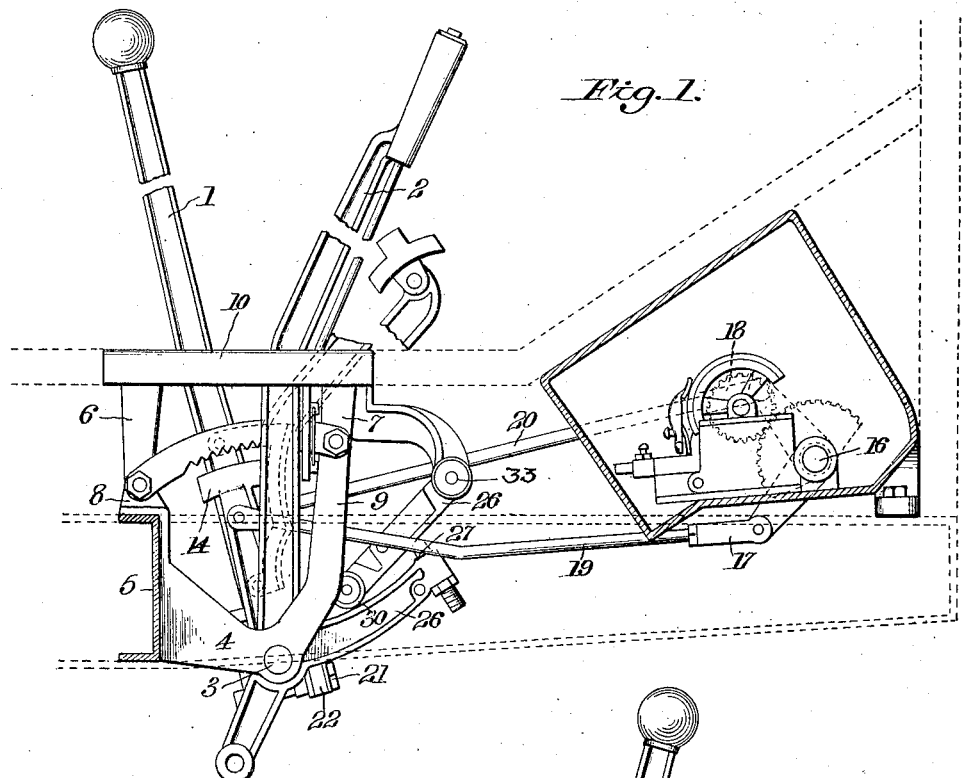
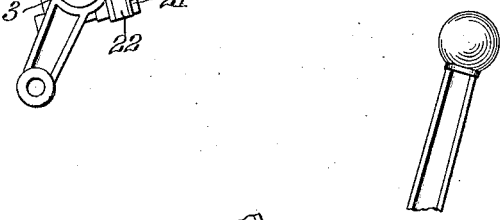
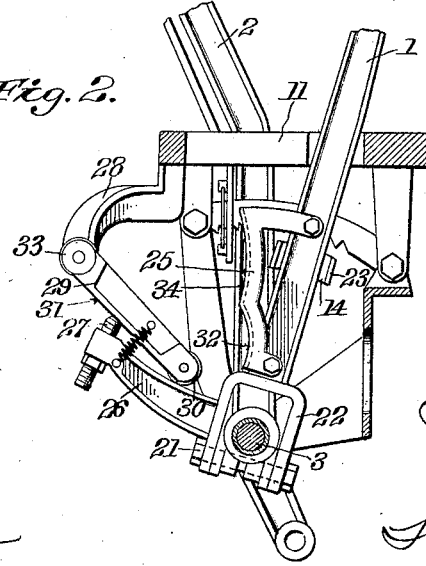

UNITED STATES PATENT OFFICE.

WILLIAM MacGLASHAN, OF DETROIT, MICHIGAN, ASSIGNOR TO THE STUDEBAKER CORPORATION, OF SOUTH BEND, INDIANA, A CORPORATION OF NEW JERSEY.

CONTROL-LOCK.

1,113,230.  Specification of Letters Patent.  Patented Oct. 13, 1914.

Original application filed February 5, 1913, Serial No. 746,330. Divided and this application filed March 9, 1914. Serial No. 823,305.

*To all whom it may concern:*

Be it known that I, WILLIAM MACGLASHAN, a citizen of the United States of America, residing at Detroit, Wayne county, State of Michigan, have invented certain new and useful Improvements in Control-Locks, of which the following is a specification.

This invention relates to a mechanical control for motor vehicles or more properly to means for locking the control when the brake is applied, the present application being a division of my application No. 746,330, filed February 5th, 1913, entitled "Control."

The harmful effects resulting to motor vehicles from the application of the brake in opposition to the motor, are well known, and the object of the present invention is to prevent this occurrence. To this end I provide a connection between the emergency brake lever and the control lever by means of which the latter is thrown to neutral position when the brake is applied and held at neutral, as the pressure on the brake lever and the tension of the brake is increased without under these circumstances in any way increasing the pressure on the control lever or the resistance to the application of the emergency brake.

This device prevents damage to the transmission and possible burning of the motor by accidental use of the emergency brake in opposition to the motor.

In the accompanying drawings a controller embodying the features of my invention in its preferred form is illustrated.

Figure 1 is a side elevation of the control looking from the right side of the vehicle. Fig. 2 is a central, vertical section showing the lock.

Referring to the drawings by numerals, each of which is applied to the same or equivalent parts of the different figures of the drawing, the control lever 1 and the emergency brake lever 2 are mounted on a single transverse shaft 3 carried by a bracket 4 having a base plate 5 adapted to be secured to one of the members of the vehicle frame. Rigidly mounted on this bracket, having depending lugs 6 and 7, which are secured to upright lugs 8 and 9 on the bracket, is a slotted plate 10 which serves as a guide for the brake and control levers. The latter extends upward through a U-shaped slot 11 in the plate, and the emergency brake lever rides in another slot in the same plate.

Two crank arms 14, 14 are mounted to rotate relatively to the shaft 3. The controller shaft or a shaft which is geared thereto, indicated by reference character 16, is provided with two crank arms 17 and 18 rigidly secured thereto and placed substantially at right angles one to the other. Of these one is connected by the rod 19 to one arm 14, and the other by the rod 20 to the other arm 14. The controller lever 1, in addition to being pivoted to swing about the shaft 3, is also pivoted by means of the pin 21 and the jaws 22 to swing in the plane of the length of the shaft 3, *i. e.*, to swing laterally. The arms 14 are provided each with jaws 23 laterally disposed and opening toward the lever 1. When the lever 1 is at the rear end of the U-shaped slot 11, *i. e.*, at the base of the U, the controller is in neutral position, *i. e.*, no current is passing through the motor, and in this position both of the arms 14 and the jaws 23 are alined with the lever 1, so that that lever may be moved laterally into engagement with either jaw, and when thus engaged may be used to rotate the arm carrying that jaw in a forward direction and to move that jaw backward to its original position.

A full explanation of the operation of the device will be found in the parent application.

For the purpose of throwing the control out and stopping the motor when the emergency brake is applied and for locking the control at neutral as long as the brake is on so the emergency brake and drive cannot operate simultaneously, the control lever 1 is provided with a cam member 25 rigidly secured thereto, and the brake lever 2 is provided with an arm 26 having a follower member 27. Pivotally mounted on the fixed bracket 28 is a swinging arm 29 carrying a cam follower 30 to coöperate with the cam 25, and the follower 27 is so placed as to coöperate with the bearing face 31 of the lever 29. The cam 25 is so formed that the lower portion of its surface 32 is inclined to the arc swung by the roller 30 when the arm 29 is rotated, so that when the brake is put on, the controller being forward, the lever 26, being thrown up, swings the arm 29 with the roller 30 upward about the center 33, engaging the inclined cam surface 32 and throwing the controller back to neutral, the upper point of the surface 32 being so placed that as the roller rides over this point, the lever 1 is forced to neutral position, but beyond this point the surface 34 in the form of an arc concentric with the axis 33, and as the pressure on the brake is increased and the brake lever swings backward, the control lever 1 is merely held in neutral position and remains locked in that position until the brake is released.

It will thus be apparent that it is impossible to put the brake on when the control is in any position other than neutral, for as the brake is applied, the control lever is operated by the cam and follower as described, and immediately thrown to neutral position, after which the brake may be forced downward with any degree of pressure, the control lever remaining in neutral position. In this way the various ills resulting from the operation of the motor against the brake are avoided.

I have thus described specifically a single embodiment of my invention in order that its nature and operation may be clearly understood. However, the specific terms herein are used in their descriptive rather than in their limiting sense and the scope of the invention is defined in the claims.

I claim:

1. A control for motor vehicles consisting of a control lever, controlling means connected thereto, a brake lever, a cam carried by the control lever, a follower, means constraining the same to move on a fixed path, and means connected to the brake lever for operating the follower to engage the cam and throw the control lever to neutral when the brake lever is operated.

2. A control for motor vehicles consisting of a control lever, a brake lever, a cam on the control lever, a follower, and means carried by the brake lever for operating the follower to throw the control lever to neutral when the brake is operated.

3. A control for motor vehicles consisting of a control lever, a brake lever, a cam on the control lever, a follower, and means carried by the brake lever for operating the follower to throw the control lever to neutral when the brake is operated, the cam being shaped to permit the follower to swing freely when the control lever is in neutral position and to lock the lever in that position when the brake is on.

4. A control for motor vehicles consisting of a control lever, a brake lever, a pivoted arm carrying a follower, follower means on the brake lever for swinging the arm, and a cam on the control lever to be engaged by the follower when the brake is applied, throwing the control lever to neutral position.

5. A control for motor vehicles consisting of a control lever, a brake lever, a pivoted arm carrying a follower, follower means on the brake lever for swinging the arm, and a cam on the control lever to be engaged by the follower when the brake is applied, throwing the control lever to neutral position, the cam having a surface inclined to the path of the follower, and a surface beyond said inclined surface in the direction of the traverse of the roller as the brake is applied conforming to the path of the follower when the controller is in normal position.

Signed by me at Detroit, Michigan, this 26 day of Feb. 1914.

WILLIAM MacGLASHAN.

Witnesses:
JAMES E. SPENCER,
GUY M. EGGLESTON.